US008233886B2

(12) United States Patent
Wässingbo

(10) Patent No.: US 8,233,886 B2
(45) Date of Patent: Jul. 31, 2012

(54) ACCESSING STORED DATA OBJECTS USING CONTACT DATA CORRESPONDING TO A REMOTE COMMUNICATIONS PARTY

(75) Inventor: Tomas Karl-Axel Wässingbo, Lund (SE)

(73) Assignee: Sony Mobile Communications AB, Lund (SE)

( * ) Notice: Subject to any disclaimer, the term of this patent is extended or adjusted under 35 U.S.C. 154(b) by 936 days.

(21) Appl. No.: 11/838,927

(22) Filed: Aug. 15, 2007

(65) Prior Publication Data

US 2009/0047934 A1    Feb. 19, 2009

(51) Int. Cl.
H04L 12/58 (2006.01)
H04L 29/06 (2006.01)
H04M 3/42 (2006.01)

(52) U.S. Cl. ............... 455/412.1; 455/415; 455/414.3

(58) Field of Classification Search ............. 455/412.1, 455/415, 412.2, 414.1, 414.2, 414.3, 456.1, 455/456.2, 456.3, 456.5, 456.6
See application file for complete search history.

(56) References Cited

U.S. PATENT DOCUMENTS

| 6,922,721 | B1 | 7/2005 | Minborg et al. | |
| 6,947,976 | B1* | 9/2005 | Devitt et al. | 709/219 |
| 6,977,909 | B2 | 12/2005 | Minborg | |
| 6,996,072 | B1 | 2/2006 | Minborg | |
| 7,085,257 | B1* | 8/2006 | Karves et al. | 370/352 |
| 7,106,702 | B2* | 9/2006 | Hua et al. | 370/255 |
| 7,340,691 | B2* | 3/2008 | Bassett et al. | 715/255 |
| 2001/0006890 | A1* | 7/2001 | Ryu | 455/414 |
| 2001/0037390 | A1* | 11/2001 | Kuroyanagi | 709/225 |
| 2003/0014395 | A1 | 1/2003 | Ruvolo et al. | |
| 2003/0050052 | A1* | 3/2003 | Minborg et al. | 455/415 |
| 2003/0087630 | A1* | 5/2003 | Wakabayashi | 455/412 |
| 2003/0135586 | A1 | 7/2003 | Minborg et al. | |
| 2004/0058694 | A1* | 3/2004 | Mendiola et al. | 455/466 |
| 2004/0110515 | A1* | 6/2004 | Blumberg et al. | 455/456.1 |
| 2004/0148347 | A1* | 7/2004 | Appelman et al. | 709/204 |
| 2005/0227676 | A1* | 10/2005 | De Vries | 455/414.1 |
| 2006/0019715 | A1* | 1/2006 | Jin | 455/566 |
| 2006/0025071 | A1* | 2/2006 | Yamazaki et al. | 455/3.06 |
| 2006/0047644 | A1* | 3/2006 | Bocking et al. | 707/4 |
| 2006/0058018 | A1* | 3/2006 | Toulis et al. | 455/422.1 |
| 2006/0142012 | A1* | 6/2006 | Kirchhoff et al. | 455/445 |

(Continued)

FOREIGN PATENT DOCUMENTS

EP    1739937 A1    1/2007

(Continued)

OTHER PUBLICATIONS

PCT—International Search Report dated Dec. 4, 2008, for Application No. PCT/EP2008/054650, Filed Apr. 17, 2008.

*Primary Examiner* — Christopher M Brandt

(74) *Attorney, Agent, or Firm* — Coats & Bennett P.L.L.C.

(57) ABSTRACT

Methods and apparatus for accessing data objects stored in a communication device are disclosed. An exemplary method comprises detecting a trigger event related to a remote communications party, retrieving contact data from a contacts database using a party identifier corresponding to the remote communications party, searching for stored data objects associated with the remote communications party, using the contact data as search parameters, and displaying the results of the search. The method may further include ranking the data objects by relevancy and formatting the display according to the ranking.

23 Claims, 4 Drawing Sheets

U.S. PATENT DOCUMENTS

| | | | |
|---|---|---|---|
| 2006/0148455 A1* | 7/2006 | Kim | 455/414.1 |
| 2006/0168204 A1* | 7/2006 | Appelman et al. | 709/224 |
| 2006/0223489 A1* | 10/2006 | Furukawa | 455/403 |
| 2006/0286971 A1* | 12/2006 | Maly et al. | 455/415 |
| 2007/0054661 A1* | 3/2007 | Park et al. | 455/418 |
| 2007/0067392 A1* | 3/2007 | Torres et al. | 709/206 |
| 2007/0111756 A1* | 5/2007 | Reed | 455/556.1 |
| 2007/0142078 A1* | 6/2007 | Chen et al. | 455/550.1 |
| 2007/0173241 A1* | 7/2007 | Nah | 455/418 |
| 2007/0202881 A1* | 8/2007 | Dervan | 455/450 |
| 2007/0233482 A1* | 10/2007 | Lee et al. | 704/246 |
| 2008/0032751 A1* | 2/2008 | Lee | 455/566 |
| 2008/0096589 A1* | 4/2008 | Klassen | 455/466 |
| 2008/0125059 A1* | 5/2008 | Schultz et al. | 455/90.2 |
| 2008/0132243 A1* | 6/2008 | Spalink et al. | 455/456.1 |
| 2008/0207233 A1* | 8/2008 | Waytena et al. | 455/466 |
| 2008/0242325 A1* | 10/2008 | Bandera et al. | 455/466 |
| 2008/0254811 A1* | 10/2008 | Stewart | 455/456.2 |
| 2008/0275865 A1* | 11/2008 | Kretz et al. | 707/5 |
| 2008/0319823 A1* | 12/2008 | Ahn et al. | 705/10 |
| 2009/0005068 A1* | 1/2009 | Forstall et al. | 455/456.1 |
| 2009/0036148 A1* | 2/2009 | Yach | 455/457 |

FOREIGN PATENT DOCUMENTS

| | | |
|---|---|---|
| EP | 1785892 A2 | 5/2007 |
| WO | 03/015381 A2 | 2/2003 |
| WO | 03/056789 A1 | 7/2003 |

* cited by examiner

ACCESSING STORED DATA OBJECTS USING CONTACT DATA CORRESPONDING TO A REMOTE COMMUNICATIONS PARTY

BACKGROUND

The present invention relates generally to communications devices for use in wired and wireless communications networks, and more particularly relates to methods and apparatus for accessing stored data objects in a communications device that are related to a remote communications party, such as a calling or called party.

Modern communication devices are increasingly likely to support a variety of applications in addition to a variety of communications modes. Mobile telephones, for example, commonly include video/still cameras and music players, and support e-mail, instant messaging, text messaging, picture messaging, online chat, and various other applications, as well as providing conventional telephone functionality.

As a result, a device user is likely to communicate with a friend, colleague, or other associate using more than one communication mode. For example, a business user might frequently receive phone calls from a client, but may also occasionally receive e-mails and text messages from the same client, using the same device. Likewise, a non-business user might exchange photos with a friend, using a picture messaging application, and might also frequently exchange instant messages with that same friend, or participate in online chat sessions, all with a single wireless device.

Increasingly, therefore, communications between a device user and another person (a "remote communications party") involve the exchange of one or more data objects, which may include e-mail messages, text messages, digital photographs, video clips, music files, instant messages, and so on. Accordingly, numerous data objects that are associated with one or more remote communications parties may be stored in a device's memory at any given time.

However, along with the increased complexity and power of communications devices, especially wireless phones, have come more frequent complaints about the weaknesses of the user interfaces provided by those devices. In particular, file management presents challenges, especially on devices with small displays and limited input capabilities. Thus, even as portable devices become more capable and provide more communications options, managing the resulting flood of messages, photos, and other data objects has become more difficult.

SUMMARY

The present invention provides methods and apparatus for accessing data objects stored in a communication device. In an exemplary method, a trigger event related to a remote communications party, such as an incoming or outgoing phone call, is detected. Contact data is retrieved from a contacts database, which may be local to the communications database or on a remote server, using a party identifier corresponding to the remote communications party. The retrieved contact data is used as search parameters in a search for stored data objects associated with the remote communications party. The results of the search are displayed on the screen. In some embodiments, data objects are ranked according to their relevancy to the remote communications party, using the contact data, and the display is formatted according to the ranking.

DETAILED DESCRIPTION

Figure 1:
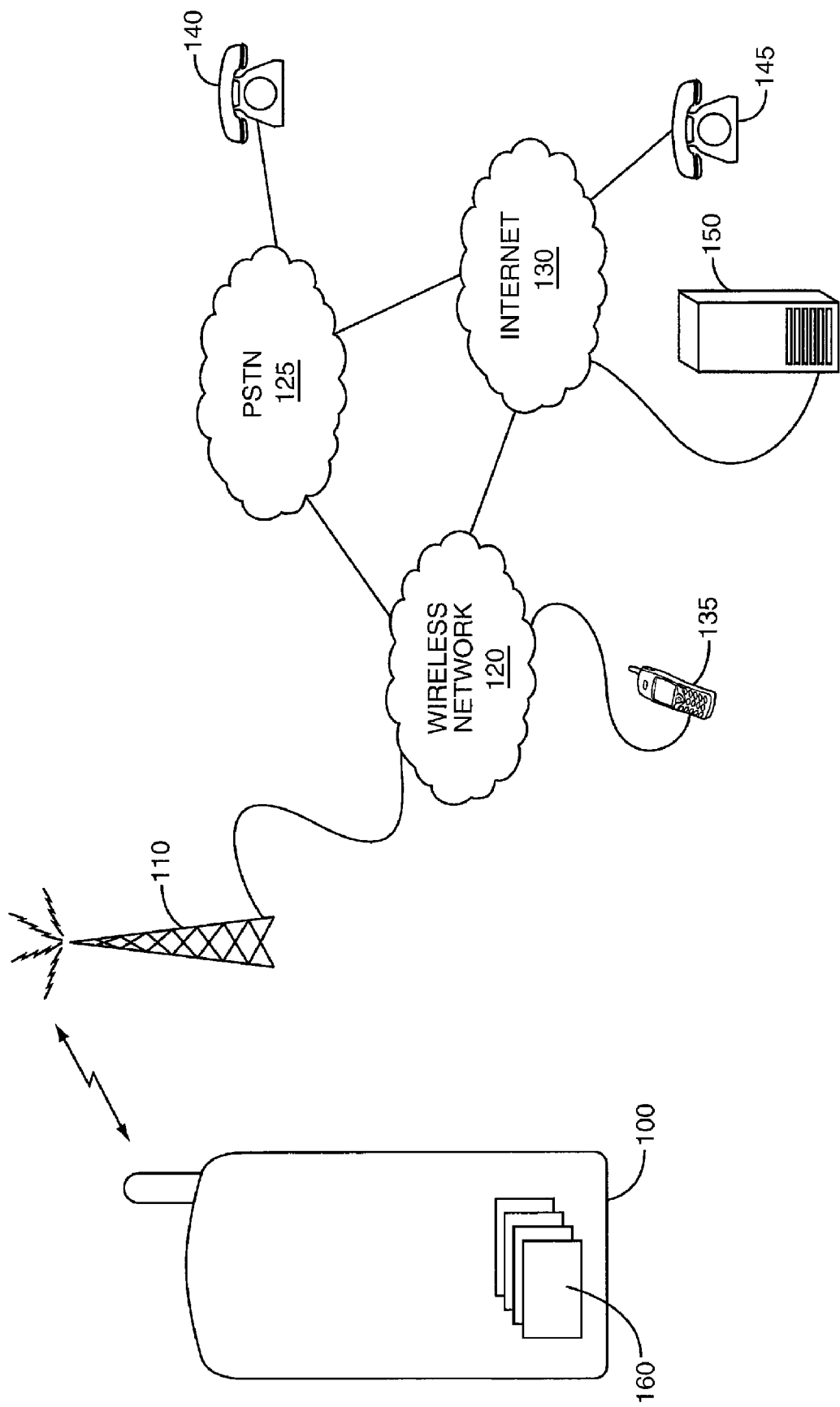
FIG. 1 illustrates a communications system in which one or more embodiments of the present invention may be used.

While the invention is susceptible to various modifications and alternative forms, specific embodiments are shown by way of example in the drawings and will be described in detail below. It should be understood, however, that there is no intent to limit the invention to the particular forms described in detail. Those skilled in the art will recognize various alternatives to the illustrated embodiments falling within the scope of the claims.

FIG. 1 illustrates a communications system in which the present invention may be employed. Communications device 100 communicates with other devices through base station 110, which is connected to wireless network 120. Wireless network 120 is in turn connected to the Public Switched Telephone Network (PSTN) 125 and the Internet 130. Wireless device 100 can thus communicate with various other devices, such as wireless device 135, conventional land-line telephone 140, or voice-over-IP (VoIP) telephone 145. In FIG. 1, wireless device 100 also has access to data server 150 via the Internet 130.

Communications device 100 may be a cordless telephone, cellular telephone, personal digital assistant (PDA), communicator, computer device, or the like, and may be compatible with any of a variety of communications standards, such as the Global System for Mobile Communications (GSM) or one or more of the standards promulgated by the 3rd-Generation Partnership Project (3GPP). Communications device 100 may include a digital camera, for still and video images, as well as a digital music player application. Communications device 100 may also support various data applications, such as e-mail, text messaging, picture messaging, instant messaging, video conferencing, and the like.

As a result, communications device 100 typically includes one or more data objects 160 generated or received by one or more of these applications and stored in memory. For example, data objects 160 may include digital photographs and video clips, some of which were generated by the built-in camera and others of which were received as an e-mail attachment or in a picture message. Data objects 160 may also include received e-mail messages, as well as copies of sent messages. Other possible data objects 160 include text messages, transcripts of instant messaging sessions, and recordings of audio and/or video phone calls.

Many of these data objects 160 include information that associates them with a remote communications party. For example, a received e-mail message or a saved copy of a sent e-mail can each be associated with a correspondent by examining header information in the stored file for names and communications addresses. Digital images received from a remote communications party might include metadata that identifies the remote communications party by name, or that specifies a device identifier or address identifier that associates the image files with the sender. In other cases, it may be possible to associate a data object with a remote communications party through its contents—an e-mail or text message might mention a party in the body of the message, or provide an e-mail or web page link; a title or file name associated with an object might include a person's name. Finally, other associations may be less direct. For instance, data objects might be associated to a remote party through references to the party's home town, to his or her college, or to other affiliated organizations. Other party-associated data might include the party's occupation, his or her birthday or other important dates, interests, hobbies, sports interests, food interests, and so on. Thus, if one knows that a remote party is a lawyer, plays golf, and is a wine connoisseur, then the terms "law" or "lawyer", "golf", and "wine" are useful terms for associating stored data objects, whether digital photos, e-mails, or the like, with the remote party.

When communicating with a remote party, whether via a telephone call, e-mail, or other form of communication, it may be useful to have improved access to those data objects 160 that are associated with that remote party. In a business context, recent e-mail correspondence may need to be reviewed. In a personal context, having easy access to e-mails may also be handy, but it is also desirable to have quick access to photographs, music tracks, or video clips that are highly relevant to a current communications partner.

Figure 2:
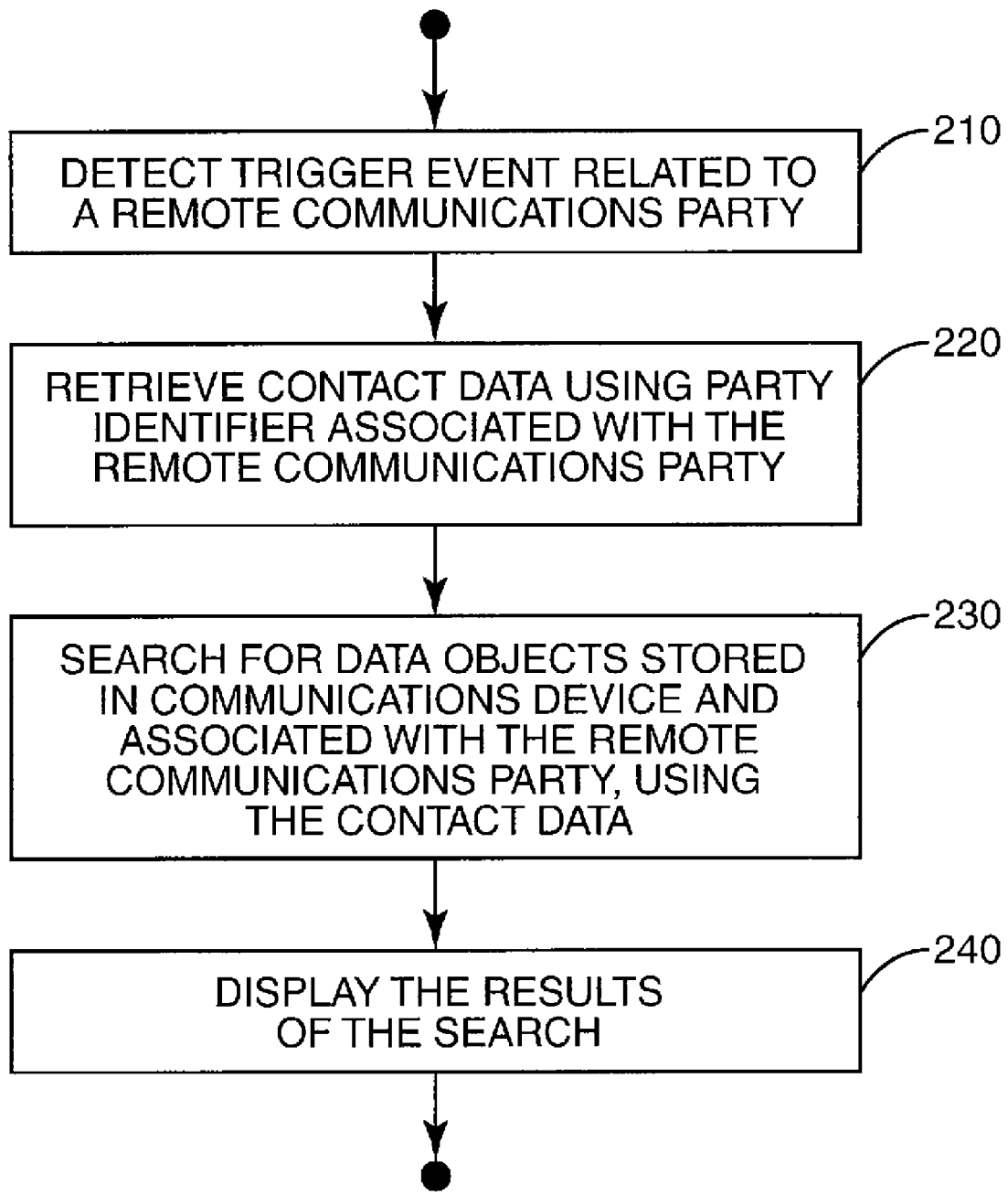
FIG. 2 is a flow diagram illustrating an exemplary method for accessing data objects in a communications device according to one or more embodiments of the invention.

FIG. 2 illustrates an exemplary method for accessing such data objects 160 in a communications device 100, according to one or more embodiments of the invention. This method and its variants are applicable to the business and personal scenarios discussed above.

At block 210, a trigger event related to a communications party is detected. The trigger event, broadly speaking, serves as an alert that a communication event has occurred or is imminent. Accordingly, detecting a trigger event may comprise detecting an actual communications event involving the remote communications party, such as an incoming or outgoing phone call, an incoming or outgoing e-mail or text message, and the like. Other communications events that may serve as triggers include the appearance of a remote party in a conference call or chat session, or a change in the online presence status of the remote communications party.

Detecting a trigger event may also comprise detecting that a communications event is imminent. For example, the entering by a user of a phone or e-mail address into communications device 100 indicates that a communications event is imminent or highly likely. Likewise, the selection of a party identifier, such as a phone number, online alias, or e-mail address, from a list also indicates that communications with that party are imminent. Accordingly, detecting a trigger event may include detecting these activities.

In a particular embodiment, the types of events that constitute trigger events may be predetermined. For example, any or all of the events described above may be defined as trigger events for communications device 100. In some embodiments, the events defined as trigger events may vary depending on the communications mode. For example, an incoming text message might be defined as a trigger event while an incoming e-mail message is not, or vice-versa. In some embodiments, some or all of the trigger events may be selected or configured by the user, or may be varied depending on a current operating profile of the communications device.

In any event, a detected trigger event will typically be associated with one or more remote communications parties that are designated by party identifiers. An incoming phone call may be associated with a remote communications party by the number and/or name supplied with calling line identification or calling name identification technology; the supplied name or number may be used as a party identifier. An outgoing phone call is most readily associated with a remote communications party by the dialed number, which may thus be used as a party identifier. Likewise, one or more party identifiers are associated with and may be easily extracted from e-mail messages, text messages, picture messages, chat sessions, and so on. Thus, a party identifier may comprise a phone number or other form of communications address, such as an e-mail address, a Session Initiation Protocol (SIP) identifier, a "screen name" or online alias, a Uniform Resource Identifier (URI) or Uniform Resource Locator (URL), or the like.

At block 220, a party identifier corresponding to the remote communications party is used to retrieve contact data from a contact database. This contact data typically comprises several items, such as names, street address, phone numbers, e-mail addresses, and the like, that identify or describe the remote communications party. In some cases, the contact data for a particular party might be relatively limited, perhaps only comprising a telephone number and a name. In others, however, the contact data might be quite extensive, comprising residential and business addresses, phone numbers, facsimile numbers, personal and business e-mail addresses, other communications addresses, occupation, educational affiliations, interests, hobbies, and so on.

In some embodiments, the contact database is stored in local memory at the communications device 100. This memory may comprise internal flash memory supplied with the device, removable memory modules, or any other non-volatile memory operatively connected to communications device 100. In these cases, the contact database may simply comprise the "address book" used to store phone numbers and/or e-mail addresses for friends and colleagues. In other cases, however, the contact database may be stored remotely, such as in data server 150, and accessible via the Internet as pictured in FIG. 1. In still other embodiments, contact data may be retrieved from a local contact database and supplemented with information retrieved from a remote data server 150. In one or more embodiments, the contact data retrieved from a remote contact database may comprise geographic location information indicating a current location of the remote communications party.

Next, at block 230, a search for data objects 160 that are associated with the remote communications party is performed, using the contact data. The various items included in the contact data are used as search parameters and compared to information associated with the data objects 160 stored in memory at the communications device. This search process may include only an analysis of metadata associated with each data object, i.e. one or more data items included in a data object that describe the object itself. This metadata might include, for example, a file name, an author name, an owner name, etc. Analysis of e-mail messages, text messages, or other data objects might only include analysis of the headers, or might also include the scanning of message bodies for matching terms.

Those skilled in the art will recognize that various known techniques for simplifying systematic searches, or speeding up searches, or both, are applicable to the search process of the present method. One approach is to conduct a complete and systematic linear search, scanning each data object 160 in turn for each of the items included in the contact data. Other more complex search heuristics, such as those employed in web search engines, may be adapted for this purpose as well. Accordingly, the search process may involve scanning data objects 160 directly, analyzing an index or concordance to the files, or both.

The results of the search are then displayed, as illustrated at block 240. Typically, the "found" data objects 160 are not themselves immediately displayed, but are instead listed, using display references such as icons, links, thumbnails or the like. Alternatively, a summary of the search results may be displayed, with a shortcut to a listing of the found data objects 160. This summary might indicate how many relevant data objects 160 were found and their types, perhaps providing a separate shortcut to a listing of each type.

Figure 3:
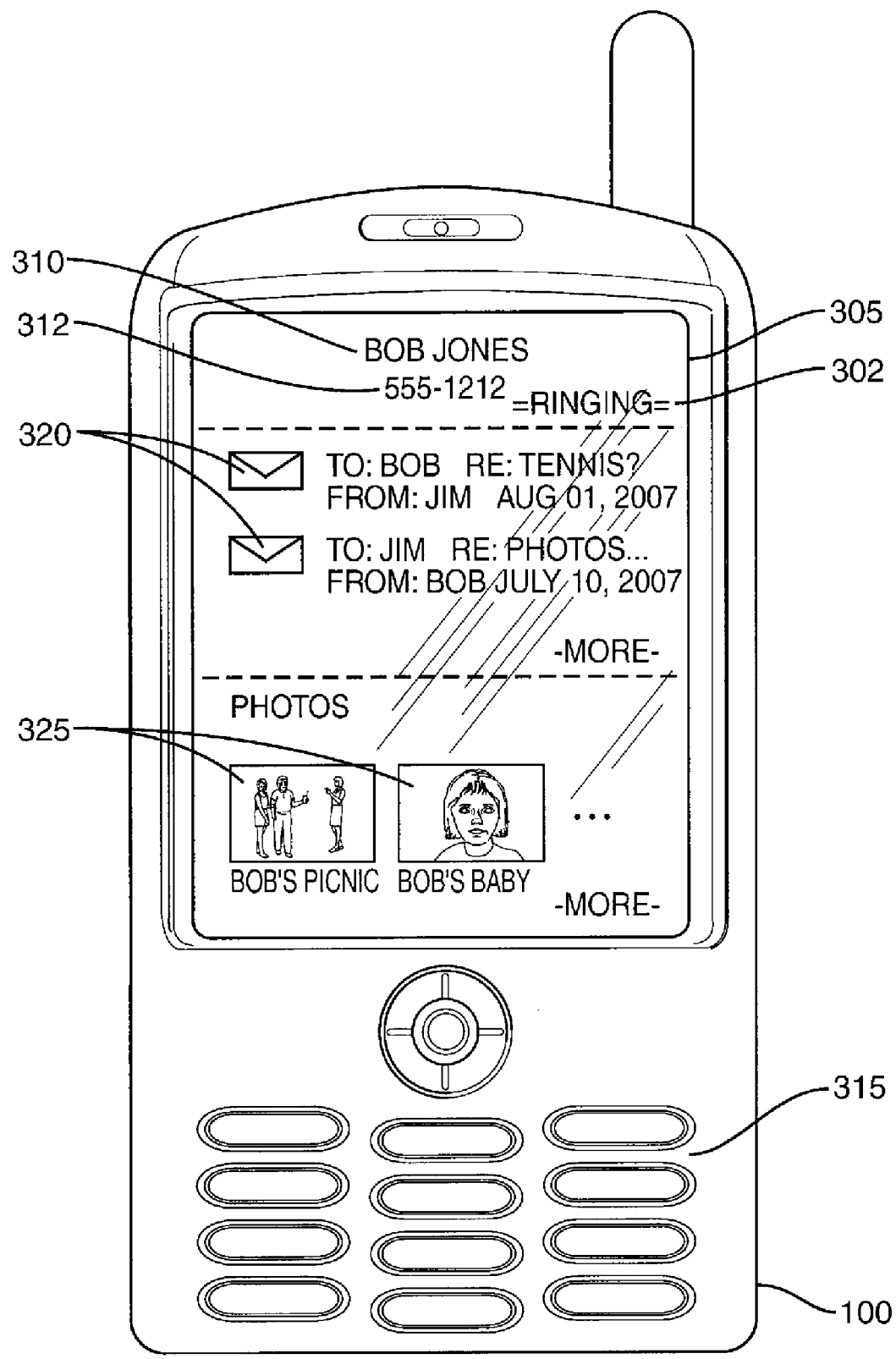
FIG. 3 illustrates an exemplary communications device.

FIG. 3 illustrates an exemplary communications device 100 displaying the results of a search conducted according to one or more embodiments of the invention. In this example, the user of communications device 100 has initiated a call, as indicated by the status indicator 302 on display screen 305. Display screen 305 also includes a called party name 310 ("Bob Jones") and a called party number 312 ("555-1212). Either of these may have been used as the party identifier for retrieving contact data related to Bob Jones. For example, the user of communications device 100 may have manually entered the phone number "555-1212" and pressed a "Dial" button, using keypad 315. Either the completion of the phone number or the pressing of the "Dial" button was recognized as a trigger event, and the called party number 312 used as a party identifier to retrieve contact data from a locally stored contacts database. Alternatively, the name "Bob Jones" may have been selected from an address book application, triggering the retrieval of the phone number and the initiation of the call. In this case, the selection of the name or the initiation of the call might serve as the trigger event.

In this example, then, the retrieved contact data includes the called party name 310 ("Bob Jones") that was retrieved from the contacts database, using the party identifier. The retrieved contact data might also include other information related to Bob Jones, such as alternative phone numbers, his address, his professional affiliations, and so on. In the example displayed in FIG. 3, this contact data has been applied as one or more search parameters in a search of the memory of communications device 100 for data objects 160 that are relevant to, i.e. associated with, the called party, Bob Jones. The results of the search appear beneath called party number 312, and include two e-mail descriptors 320, as well as several photo descriptors 325. The e-mail descriptors each include a message icon, indicating the type of data object, as well as information extracted from the corresponding data objects 160 that identifies the sender, recipient, topic, and date for each message. Similar descriptors might be used for other types of messages, such as text messages, multimedia messages, or the like. The photo descriptors 325 include thumbnail images, as well as file names associated with the image data objects that were found to be relevant to Bob Jones.

In the embodiment pictured in FIG. 3, keypad 315 may be used to select one or more of the descriptors to access the contents of the referenced data object 160. For example, selecting one of the photo descriptors 325 may cause a larger version of the photo to be displayed. Various operations that may be performed with the selected item are also available. For example, selection of a photo descriptor 325 may trigger a menu of available options that allow the photo to be printed, attached to a message, or immediately forwarded to Bob Jones. Other operations, allowing various manipulations of the selected item, may also be available.

In some embodiments of the invention, data objects 160 may be scored, or "ranked", for relevancy. This ranking provides an indication of the strength of the association between a found data object 160 and the remote communications party, and will tend to indicate the likelihood that the user of communications device 100 is interested in viewing or processing the data object 160.

As with the searching process itself, any of a variety of ranking approaches may be applied. A simple ranking algorithm may compute a score for each associated data object 160 based on the number of different items from the contact data that match the data object 160, or the number of times that an item is matched within a data object 160, or both. Certain elements of the contact data may carry greater weights, so that a match to that element results in a higher score than if another element is matched. Matching of an element to certain portions of a data object 160 may likewise carry greater weight. For instance, a matched e-mail identifier found in the header of an e-mail message might result in a higher score than the same matched e-mail identifier found in the body of the e-mail message. In some embodiments of the invention, the user of communications device 100 may be permitted to adjust the weights used in the ranking process, to better reflect the user's personal interests.

Figure 4:
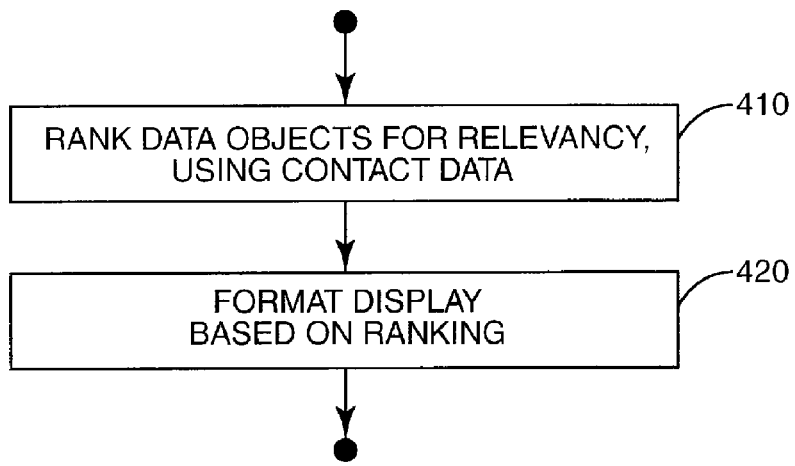
FIG. 4 is a flow diagram illustrating an exemplary method for processing data objects.

FIG. 4 illustrates a flow diagram for ranking data objects 160 and displaying the results of the ranking. At block 410, data objects 160 are ranked for relevancy, using the contact data retrieved from the contact database with the party identifier. In a typical embodiment, data objects 160 that are highly relevant receive a high score, or rank, such as "100%", while data objects with little or no relevancy receive a score as low as zero.

At block 420, a display is formatted based on the ranking. In some embodiments, one or more of the highest ranking objects is displayed or listed on the device display screen, with the highest ranking object or objects listed first. In other embodiments, the display screen may be divided into two or more regions for displaying results related to different categories of data objects 160. For example, display screen 305 in FIG. 3 includes a region containing e-mail descriptors 320 and another region containing photo descriptors 325. Within each region, data objects 160 may be listed in order of relevancy. In some embodiments, the user of communications device 100 may be permitted to set viewing preferences that govern the format of display 305. For example, the user might be permitted to specify which category of data object appears first, how many items appear in each category, the size or appearance of icons, and so on.

Figure 5:
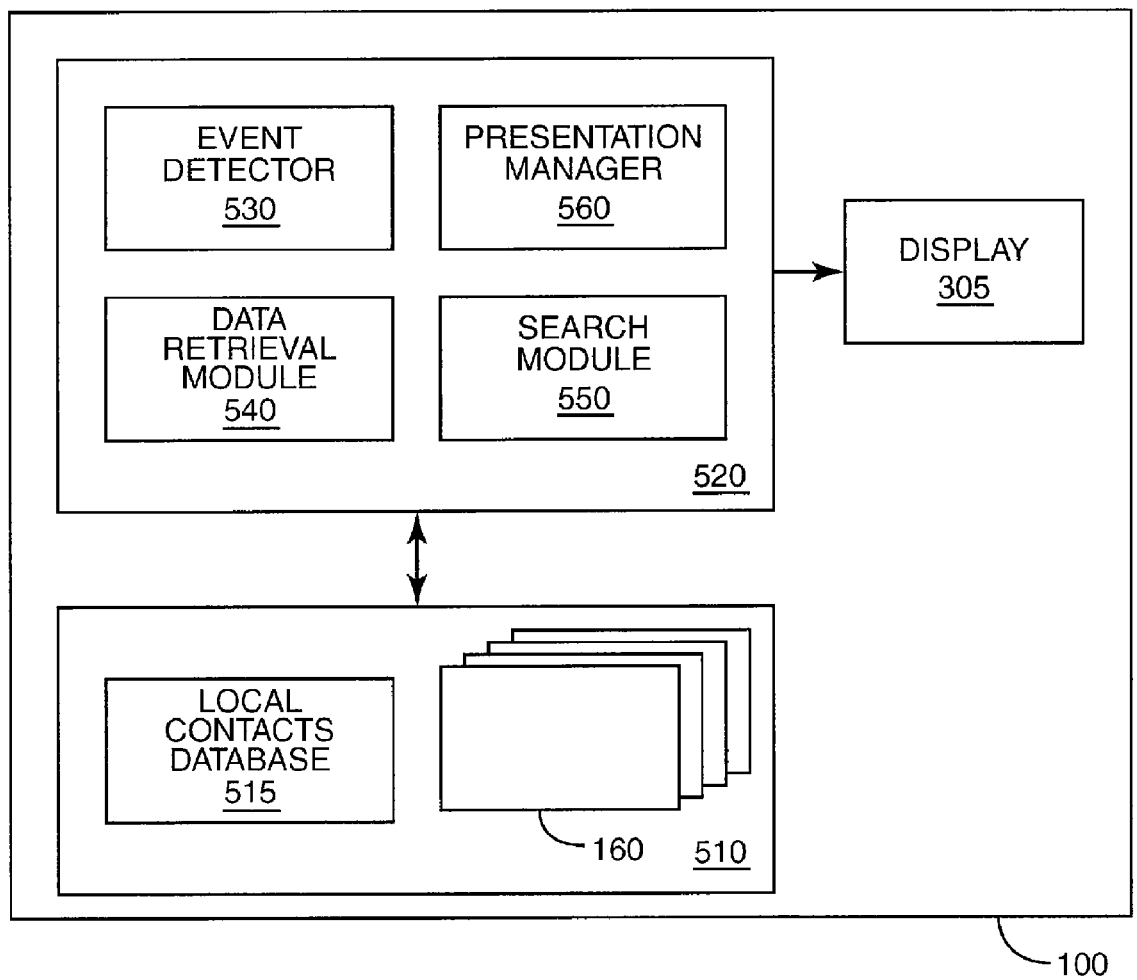
FIG. 5 is a block diagram illustrating functional components of an exemplary communications device according to several embodiments of the invention.

FIG. 5 illustrates a communications device 100 configured in accordance with one or more embodiments of the invention. In the pictured embodiment, communications device 100 comprises memory unit 510, which is configured to store a local contacts database 515 and a plurality of data objects 160. Memory unit 510 may comprise one or more memory devices, such as flash memory, removable memory modules, hard disk drives, optical memory, and the like. Local contacts database 515 typically includes a plurality of records associated with individuals or businesses, wherein the records are generally retrievable using a party name. In some embodiments, the records, each of which comprises contact data such as phone numbers, communications addresses, physical addresses, etc., may be ordered and retrieved according to one or more record elements other than party name. For instance, individual records might be retrieved from local contacts database 515 using any of several phone numbers (home, work, etc.), first or last name, etc.

Communications device 100 also comprises a processor 520 configured to perform one or more of the methods described above. FIG. 5 illustrates several functional components corresponding to processes carried out by processor 520, including an event detector 530, data retrieval module 540, search module 550, and presentation manager 560. Those skilled in the art will recognize that these functional components may be implemented using one or several microprocessors, microcontrollers, or other data processing components. In other words, the term "processor" as used herein may refer to one or several devices configured to carry out a programmable function.

Event detector 530 is configured to recognize the occurrence of any of a plurality of predetermined trigger events. As discussed above, these trigger events may be actual communications events, such as the receipt of an incoming message, or may be events that indicate that a communication event is imminent, or likely. In any event, a trigger event is associated with one or more remote communications parties; event detector is further configured to obtain a party identifier associated with the trigger event. As discussed above, this party identifier may comprise a telephone number, name, e-mail or other electronic identifier, or the like.

The party identifier is used by data retrieval module 540 to retrieve contact information from local contacts database 515. In some embodiments, data retrieval module 540 may also be configured to retrieve contact information, using a party identifier, from a remote database, such as server 150 pictured in FIG. 1. This remotely retrieved contact information may be used instead of data retrieved from local contacts database 515, or as a supplement to locally obtained contact information.

In any event, contact information retrieved from either the local contacts database 515, a remote contacts database, or both, is used by search module 550 to conduct a search of memory 510 for data objects 160 that are relevant to the remote communications party identified by the party identifier.

Presentation manager 560 is configured to format a display 305 of communications device 100 based on the results of the search conducted by search module 550. The formatted display may comprise one or more of the relevant data objects 160, or may comprise a listing of references indicating the relevant data objects. In some embodiments, search module 550 is configured to rank the relevant data objects; in these embodiments presentation manager 560 may be configured to format the display according to that ranking. For example, a listing of relevant data objects 160 may be ordered according to the rankings produced by search module 550.

Those skilled in the art will appreciate that several of the functional components of communications device 100, such as event detector 530, data retrieval module 540, search module 550, and presentation manager 560, may be implemented using computer program instructions and/or hardware operations. These computer program instructions may be stored in memory 510, or in another memory device. These computer program instructions may be provided to a microprocessor or other programmable data processing apparatus to produce a machine, such that the instructions, which execute via the processor of the computer or other programmable data processing apparatus, create means for implementing the functions described herein and illustrated in the accompanying block diagrams and flow diagrams.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions described herein. Several of the functional entities described herein may be implemented together on a single processor or computer, or each may be implemented on separate processors or computers. Those skilled in the art will recognize the advantages and disadvantages of grouping or distributing the functions described herein.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for accessing data objects in a communications device, comprising:
   detecting a trigger event related to a remote communications party;
   retrieving contact data from a contacts database using a party identifier corresponding to the remote communications party, the retrieved contact data comprising a plurality of data items related to the remote communications party;
   searching for data objects stored in the communications device and associated with the remote communications party, using the plurality of data items; and
   displaying the results of the search.

2. The method of claim 1, wherein detecting a trigger event comprises detecting that the party identifier has been entered into the communications device by a user or that a party identifier has been selected by a user from a plurality of identifiers.

3. The method of claim 1, wherein detecting a trigger event comprises detecting a communication event involving the remote communications party.

4. The method of claim 3, wherein retrieving contact data from a contacts database using a party identifier comprises retrieving the contact data using a communications address corresponding to the remote communications party.

5. The method of claim 3, wherein detecting a communication event comprises detecting one of an incoming or outgoing phone call with the remote communications party.

6. The method of claim 5, wherein retrieving contact data from a contacts database using a party identifier comprises retrieving contact data from the contacts database using a phone number corresponding to the incoming or outgoing phone call.

7. The method of claim 3, wherein detecting a communication event comprises detecting the online presence of the remote communications party.

8. The method of claim 3, wherein detecting a communication event comprises detecting one of an incoming message from the remote communications party or outgoing message to the remote communications party.

9. The method of claim 1, wherein retrieving contact data from a contacts database using a party identifier comprises accessing a local database for locally stored contact data corresponding to the party identifier.

10. The method of claim 1, wherein retrieving contact data from a contacts database using a party identifier comprises accessing a remote database for contact data corresponding to the party identifier.

11. The method of claim 1, wherein the plurality of data items comprises one or more alternative party identifiers, and wherein searching for data objects stored in the communications device comprises searching for the data objects using at least one of the alternative party identifiers.

12. The method of claim 1, wherein the plurality of data items comprises geographic location information, and wherein searching for data objects stored in the communications device comprises searching for the data objects using the geographic location information.

13. The method of claim 1, wherein displaying the results of the search comprises displaying one or more of the data objects or displaying links to one or more of the data objects.

14. The method of claim 1, further comprising ranking the data objects for relevancy, wherein displaying the results of the search comprises formatting the display based on the ranking.

15. The method of claim 14, wherein formatting the display based on the ranking comprises organizing the data objects by object type and rank within each object type.

16. The method of claim 1, wherein detecting a trigger event comprises detecting one of a plurality of pre-defined trigger events.

17. A communications device, comprising:
a display;
a memory unit; and
a processor connected to the display and memory unit, and configured to:
detect a trigger event related to a remote communications party;
retrieve contact data from a contacts database using a party identifier corresponding to the remote communications party, the retrieved contact data comprising a plurality of data items related to the remote communications party;
search for data objects stored in the memory unit and associated with the remote communications party, using the plurality of data items; and
present the results of the search using the display.

18. The communications device of claim 17, wherein the memory unit is configured to store the contacts database.

19. The communications device of claim 17, wherein the contacts database is stored in a remote server and the processor is configured to retrieve the contact data by accessing the remote server.

20. The communications device of claim 17, wherein the processor is further configured to rank the data objects for relevancy and to format the display based on the ranking.

21. The communications device of claim 17, wherein the processor is configured to detect any of the following trigger events:
the entry of a party identifier into the communications device by a user;
the selection of a party identifier by the user from a plurality of identifiers;
an incoming phone call;
an outgoing phone call;
the online presence of the remote communications party;
an incoming message; or
an outgoing message.

22. The communications device of claim 17, wherein the processor is configured to detect any of a plurality of predetermined trigger events.

23. The communications device of claim 22, wherein the predetermined trigger events are configurable by a user of the communications device.

* * * * *